United States Patent [19]

Danylchuk

[11] 3,713,118

[45] Jan. 23, 1973

[54] SINGLE WALL DOMAIN FANOUT CIRCUIT

[75] Inventor: Irynej Danylchuk, Morris Plains, N.J.

[73] Assignee: Bell Telephone Laboratories, Incorporated, Murray Hill, N.J.

[22] Filed: May 27, 1970

[21] Appl. No.: 41,028

[52] U.S. Cl. .340/174 ZA, 340/174 TF, 340/174 SR, 340/174 AC, 340/174 ZB

[51] Int. Cl. ..........................G11c 19/00, G11c 11/14

[58] Field of Search ...................340/174 TF, 174 SR

[56] References Cited

UNITED STATES PATENTS 3,523,286 8/1970 Bobeck et al. ..................340/174 TF

OTHER PUBLICATIONS

IBM Technical Disclosure Bulletin - Vol. 13; No. 6 Nov. 1970 pg. 1409.

*Primary Examiner*—James W. Moffitt
*Attorney*—R. J. Guenther and Kenneth B. Hamlin

[57] ABSTRACT

An arrangement of magnetically soft overlay elements on a magnetic material, in which single wall domains can be moved, is designed to generate two domains for each domain advanced to it in response to a magnetic field reorienting in the plane of the material. A number of these arrangements are cascaded to perform a fanout function which doubles the number of domains for each cycle of the in-plane field.

6 Claims, 6 Drawing Figures

INVENTOR
I. DANYLCHUK
BY Herbert M. Shapiro
ATTORNEY

SINGLE WALL DOMAIN FANOUT CIRCUIT

FIELD OF THE INVENTION

This invention relates to magnetic memory arrangements and, more particularly, to such arrangements in which patterns of single wall domains representative of information are moved through a magnetic medium.

BACKGROUND OF THE INVENTION

A single wall domain is a magnetic domain encompassed by a single domain wall which closes on itself in the plane of the medium in which it moves. Such a domain is a stable, self-contained entity free to move anywhere in the plane of the medium in response to offset attracting magnetic fields.

Magnetic fields are often provided in such arrangements by an array of conductors pulsed individually by external drivers. The shape of the conductors is dictated by the shape of the domain and by the material parameters. Typical materials suitable for the movement of single wall domains exhibit a preferred direction of magnetization normal to the plane of movement and are magnetically isotropic in the plane for all practical purposes. Conductors suitable for domain movement in such materials are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of signal wall domains in such a manner is disclosed in U.S. Pat. No. 3,460,116 of A. H. Bobeck, U. F. Gianola, R. C. Sherwood, and W. Shockley, issued Aug. 5, 1969.

An alternative propagation technique involves the generation of a reorienting magnetic field in the plane of movement of domains. Such a technique employs an overlay of magnetically soft elements disposed to respond to a uniform in-plane field to generate magnetic pole patterns. As the field reorients, different elements, consecutively aligned with the field, exhibit poles which attract domains to consecutive positions in a propagation channel.

The latter propagation technique is particularly useful for large capacity sequential memories such as disc files. In such arrangements, no electrical conductors are necessary except where a specific function is to be implemented locally. But advantage may be taken of the geometry of the magnetic overlay to build in certain functional operations in the absence of conductors. For example, a domain generator which avoids the necessity for electrical conductors is shown in copending application Ser, No. 756,210, filed Aug. 29, 1968 for A. J. Perneski and now U.S. Pat. No. 3,555,527. The generator comprises a magnetically soft overlay element on a surface of a material in which single wall domains can be moved. A domain is moved in the material about the periphery of the element as a magnetic field reorients in the plane of the material. The domain acts as a seed continuously present for generating a domain for propagation during each cycle of the in-plane field.

BRIEF DESCRIPTION OF THE INVENTION

The present invention is a modification of the generator disclosed in the application of A. J. Perneski and provides a two-domain output for each domain introduced to it in the absence of a seed domain. To be specific, an illustrative embodiment of the invention includes a magnetically soft, generally rectangular overlay element on the surface of a material in which domains can be moved. The element has a portion thereof removed for forming an asymmetric U-shape. As the in-plane field rotates, domains are moved along a first channel to the modified generator. The modified generator, descriptively termed a "doubler" herein, generates two domains. A number of doublers are cascaded for providing a fanout circuit which doubles the number of domains for each rotation of the in-plane field.

DETAILED DESCRIPTION

Figure 1:
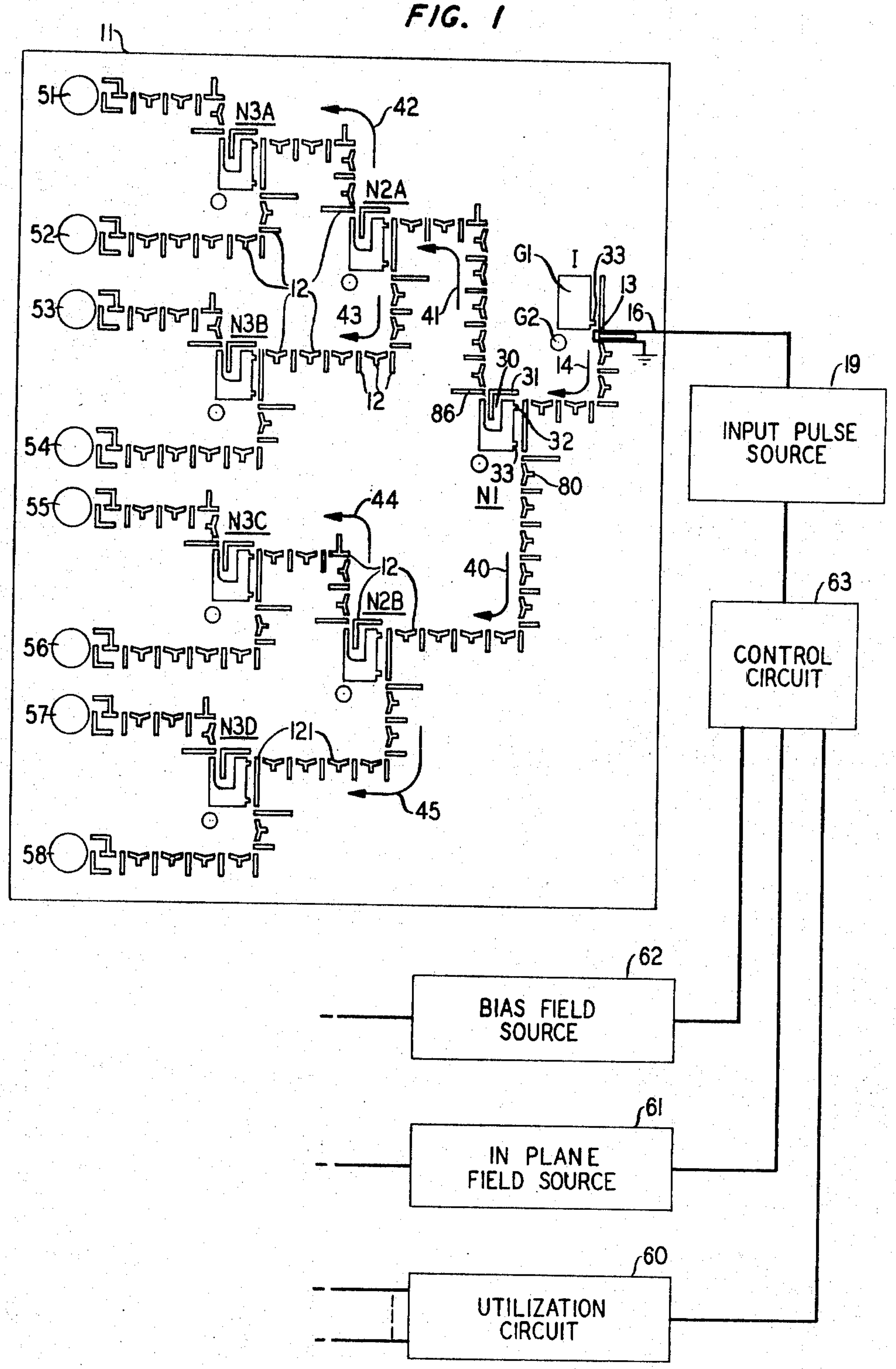
FIG. 1 is a schematic illustration of a fanout arrangement in accordance with this invention.

FIG. 1 shows a domain fanout circuit in accordance with this invention. The circuit comprises a sheet or slice of material 11 in which single wall domains can be moved. The movement of domains in slice 11 is effected entirely by the geometry and disposition of magnetically soft overlay elements 12 illustratively in response to a magnetic field rotating clockwise in the plane of slice 11 as viewed in FIG. 1.

A selective input for domains is defined at I in FIG. 1. The input comprises, illustratively, square and circular shaped magnetically soft overlay elements G1 and G2 respectively, typically of low coercive force permalloy. In operation, each of these elements normally has a domain which moves about its periphery in response to the rotating field. The domains interact to provide a single domain at 13 for propagation along the channel indicated by arrow 14 in FIG. 1. An input arrangement of this type is disclosed in my copending application Ser. No. 39,581, filed May 22, 1970 now U.S. Pat. No. 3,633,185.

The input arrangement operates to stretch and then to divide into two a domain moving about G1. The operation depends on a "seed" domain moving about the periphery of G1 being deformed (stretched) and then divided into two by following, simultaneously, two attracting pole patterns which "move" apart. One pole pattern moves about element G1, the other down the channel indicated by arrow 14 in FIG. 1.

Each cycle of the in-plane field results in a domain for propagation unless this operation is inhibited. Conductor 16 of FIG. 1, illustratively, encircling one of the overlay elements of the input channel (14), is shown for this purpose. The conductor is connected between an input pulse source 19 and ground operating to inhibit the formation of attracting poles in the encircled overlay element thus inhibiting domain stretching and division.

It will be noticed that many of the overlay elements of FIG. 1 are of modified T (or Y-shaped) geometries and bars interconnecting nodes or intersections. The nodes comprise overlay geometries which include modifications of the input overlay G1. Specifically, each of nodes Nni (where *n* and *i* are dummy variables) comprises an overlay similar to G1 in geometry but having a mouth portion shown at 30 for node N1 forming a U-shaped element into which an L-shaped overlay element 31 is inserted. The modification also calls for an extension 32 on the element in addition to the extension 33 on element G1. Each node also includes an element identical to G2 at I. Each element G2 normally has a domain moving about its periphery.

The function of each node is to produce two domains for each introduced to it. The circuit of FIG. 1 thus functions as a binary tree having three stages, the N1 stage resulting in two domains, one moving along each of two channels indicated by arrows 40 and 41 of FIG. 1, the N2 stage resulting in four domains, one moving along each of the channels indicated by arrows 42, 43, 44, and 45, and the N3 stage resulting in a domain in each of the eight outputs 51–58.

The presence of a domain at each of the outputs is detected by any one of a number of detector arrangements or utilization circuits well understood in the art. Such a circuit is represented here merely as a block 60 in FIG. 1 without further discussion.

The in-plane field as well as a bias field for maintaining domain size constant are also well understood and the sources of those fields are represented by blocks 61 and 62 in FIG. 1 without further discussion. The various sources and circuits are connected to a control circuit 63 for activation and synchronization.

We have now discussed the overall organization of the fanout circuit of FIG. 1. That organization is based on the function of the overlay at each node and we will now direct our attention to the operation of a node and to the overlay geometry which permits that operation. FIGS. 2A, 2B, 2C, 2D, and 2E show the introduction of a domain to a representative node N1 and the stretching as well as the separation into two of such a domain as the in-plane field rotates through a complete cycle.

Figure 2A:
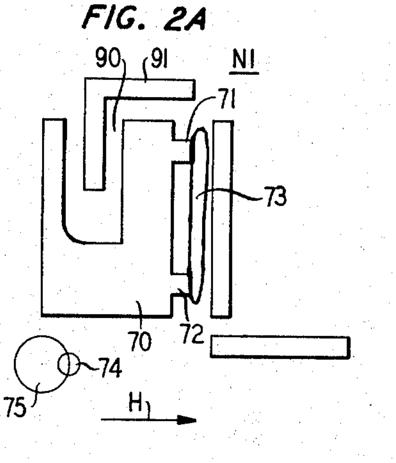
FIGS. 2A, 2B, 2C, 2D, and 2E are schematic illustrations of portions of the arrangement of FIG. 1 showing the magnetic condition thereof during operation.

A domain is moved to overlay 70 of FIG. 2A when the in-plane field is directed to the right as indicated by arrow H in the figure. In response to the field, attracting poles spread over the right edge of the overlay as viewed with relatively large concentrations at extensions 71 and 72 as shown in the figure. The domain 73 assumes the general shape shown. A domain 74 also is moved simultaneously to the right of overlay 75 in response to the in-plane field.

Figure 2B:
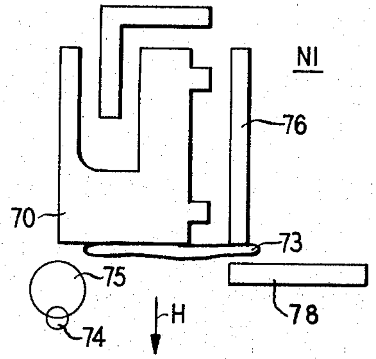

The in-plane field next rotates to a downward orientation shown by arrow H in FIG. 2B. Domain 73 moves to the bottom of overlay 70 stretching to element 76 as shown because of a high concentration of attracting poles there. Domain 74 moves to the bottom of overlay 75 simultaneously as viewed in the figure.

Figure 2C:
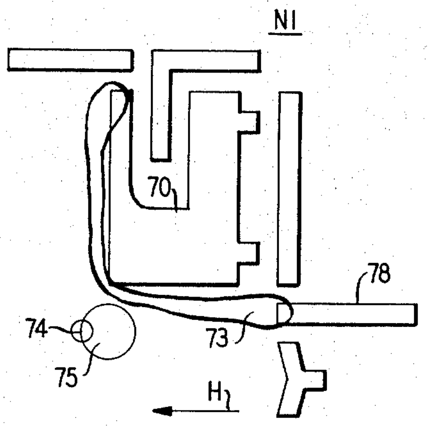

FIG. 2C shows the arrow H directed toward the left. Domain 73 is now firmly latched to the left end of overlays 78 and 70. Domain 74 moves to the left of overlay 75.

Figure 2D:
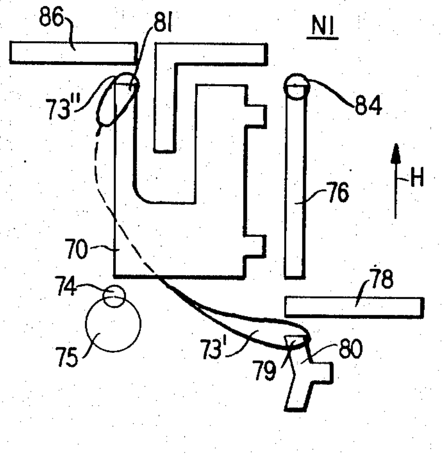

In FIG. 2D, the in-plane field is directed upward. At this juncture in the in-plane field cycle, domain 73 divides into two as represented by the two elongated domains 73' and 73'' shown in the figure with a broken line connecting them. Domain 73' is firmly attracted to the leftmost portion 79 at the top of overlay 80 whereas domain 73'' is firmly attracted to portion 81 of overlay 70. Domain 74 is at the top of overlay 75 supplying a repulsion force contributing to the division of domain 73. Another domain 84 is shown at the top of overlay element 76 in FIG. 2D occupying a position next preceding the domain position shown for 73 in FIG. 2A. The cycle repeats.

Figure 2E:
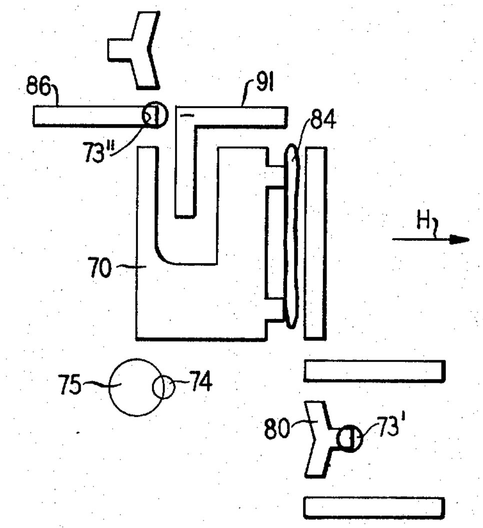

FIG. 2E shows domain 84 occupying the position occupied by domain 73 in Fig. 2A as the field H next reorients to the right. Domains 73' and 73'' are shown simultaneously moved to positions on overlay elements 80 and 86 respectively while domain 74 moves to the right edge of overlay 75.

It should be clear that domain 73 is divided into two in this operation without requiring initially or leaving subsequently a seed domain for movement about overlay element 70. For example, in FIGS. 2D and 2E, if domain 84 were not introduced to overlay element 70, no domain would be present for movement about the periphery of that element. Domains 73' and 73'' are already spaced apart from element 70 being moved by the in-plane field along channels 40 and 41 to nodes N2B and N2A of FIG. 1 respectively where each is again divided into two as shown in FIGS. 2A through 2E.

Information, of course, requires that no seed domain remain at a node. Otherwise, a domain or a domain pair is produced for each in-plane field cycle regardless of incoming information (presence and absence of domains). FIG. 2A shows a mouth area 90 in element 70 along with the L-shaped overlay element 91, illustratively, to ensure this operation. The mouth defines portion 81 noted in FIG. 2D shown occupied by domain 73'' in that figure. In the absence of the mouth, poles distribute along the entire upper edge of element 70 in that figure resulting in a stretched domain only an end of which would latch to element 86 in FIG. 2E when the in-plane field next reorients. The mouth, on the other hand, localizes attracting poles and thus domain 73''. When the field next reorients as shown in FIG. 2E, not only does the localized domain "see" a strong attracting pole at the right end of element 86 in FIG. 2E, it "sees" a strong repelling pole at the left edge of element 91 shown as a minus sign in FIG. 2E. The absence of the mouth and element 91 results in an undesired seed domain for continuous movement about 70; the presence of a mouth, particularly with element 91, results in the provision of two domains in the absence of such a seed as required in accordance with this invention.

Extensions 71 and 72 are convenient elements to stretch an incoming domain as shown in FIG. 2A. In the absence of such extensions it is difficult to attract the end of domain 73 to element 76 of FIG. 2B. Hence, no generation and propagation of a domain along the elements 78 and 80 occurs.

The arrangement of FIG. 1 has been operated with a platelet of samarium terbium orthoferrite ($Sm_{.55}Tb_{.45}Fe_2O_3$) An overlay pattern of 100 mils × 150 mils on 8 mil centers was employed for moving 2 mil diameter domains. Each node comprised an element 10 mils ×

10 mils with a mouth having dimensions 5 mils × 6 mils. The L-shaped element was 6 mils × 6 mils, 1 mil wide and element 75 of FIG. 2A had a diameter of 4 mils. A bias field of 50 oersteds was employed along with an in-plane field of 15 oersteds and a frequency of about 200 Hz. Three rotations of the in-plane field produced eight outputs (domains) at 51–58 of FIG. 1 for each domain introduced at I.

What has been described is considered only illustrative of the principles of this invention. Therefore, various modifications can be devised by those skilled in the art in accordance with those principles without departing from the scope and spirit of this invention.

What is claimed is:

1. A magnetic domain fanout circuit comprising a material in which single wall domains can be moved, a magnetically soft overlay adjacent a surface of said material, means for generating a reorienting in-plane field for providing changing magnetic pole patterns in said overlay, said overlay defining first and second channels for single wall domains and an intersection therebetween, and a magnetically soft overlay at said intersection, said overlay at said intersection having a geometry for dividing into two a domain advanced to said intersection for movement along both of said channels thereafter in response to said in-plane field, said overlay at said intersection being operative to move a domain about the periphery thereof and also being of a geometry such that a domain so moved is eliminated from that periphery prior to the completion of one traversal thereof.

2. A circuit in accordance with claim 1 in which said overlay at said intersection is of a geometry to localize and then repel a domain moving about an element thereof.

3. A circuit in accordance with claim 2 wherein said overlay at said intersection comprises an element generally rectangular in shape and having a mouth portion therein and including a separate element extending into said mouth for providing a repulsion force for a domain moving about the periphery of said rectangular element once each cycle of said in-plane field.

4. A plurality of circuits in accordance with claim 3 and means for cascading said circuits into an *n* stage binary tree arrangement.

5. A circuit in accordance with claim 3 including means for selectively introducing domains to said generally rectangular overlay element at said intersection.

6. A circuit in accordance with claim 4 including means for selectively introducing domains to said generally rectangular overlay element at an intersection in a first stage of said binary tree and means for detecting the presence or absence of domains generated at intersections in said *n*th stage.

* * * * *